(12) United States Patent  (10) Patent No.: US 8,793,568 B2
Aman et al.  (45) Date of Patent: Jul. 29, 2014

(54) PAGE DESIGNER WITH CUSTOMIZATION CONSTRAINTS

(75) Inventors: Naima Aman, Piscataway, NJ (US);
Joan McGraw, Glen Rock, NJ (US);
Kathleen Devlin, Johnston, IA (US);
Jeremy Van Cuylenburg, Brooklyn, NY (US); Matthew R. Foster, Poplar Grove, IL (US)

(73) Assignee: Accenture Global Services Limited, Dublin (IE)

( * ) Notice: Subject to any disclaimer, the term of this patent is extended or adjusted under 35 U.S.C. 154(b) by 214 days.

(21) Appl. No.: 13/032,435

(22) Filed: Feb. 22, 2011

(65) Prior Publication Data

US 2012/0216137 A1  Aug. 23, 2012

(51) Int. Cl.
*G06F 17/00* (2006.01)

(52) U.S. Cl.
USPC ............................ 715/227; 715/764; 715/968

(58) Field of Classification Search
USPC ......... 715/209, 764, 765, 769, 779, 780, 810, 715/835, 837, 968, 227
See application file for complete search history.

(56) References Cited

U.S. PATENT DOCUMENTS

| 5,392,220 | A | * | 2/1995 | van den Hamer et al. | .... 716/105 |
| 5,418,950 | A | * | 5/1995 | Li et al. | .......................... 715/781 |
| 5,701,453 | A | * | 12/1997 | Maloney et al. | ............... 707/714 |
| 2002/0063734 | A1 | * | 5/2002 | Khalfay et al. | ................ 345/744 |
| 2008/0250071 | A1 | | 10/2008 | Norring et al. | |
| 2009/0217182 | A1 | | 8/2009 | Grechanik et al. | |
| 2011/0225525 | A1 | * | 9/2011 | Chasman et al. | ............. 715/763 |

FOREIGN PATENT DOCUMENTS

EP  0 564 845 A2  10/1993

OTHER PUBLICATIONS

Extended European Search Report dated Jun. 6, 2012 for pending European Patent Application No. 12001181.2.
Patent Examination Report No. 1 dated Oct. 26, 2012 for co-pending Australian Patent Application No. 2010200992.
Office Action issued in corresponding Australian Patent Application No. 2012200992, mailed Nov. 28, 2013, 2 pages.
Patent Examination Report No. 1 dated Oct. 26, 2012 for Australian Patent Application No. 2012 200 992, pp. 1-4.

* cited by examiner

*Primary Examiner* — Shen Shiau
(74) *Attorney, Agent, or Firm* — Brinks Gilson & Lione (57) ABSTRACT

A page design system addresses the need to impart flexibility into the design and customization of graphical user interfaces for applications. The graphical user interface includes pages and display groups within each page, and the page design system permits each individual page to be modified to suit the needs of a particular customer. So that the pages do not depart from their fundamental purpose to too great of an extent, the page design system guides and constrains the modifications to each page. In particular, the page design system constrains customization of each display group according to established definitions of admissible graphical user interface elements that are appropriate for each page, and each display group of elements within the page.

18 Claims, 7 Drawing Sheets

PAGE DESIGNER WITH CUSTOMIZATION CONSTRAINTS

BACKGROUND OF THE INVENTION

1. Technical Field

This disclosure relates to the design of graphical user interfaces. In particular, this application relates to a page designer that guides and constrains customization of user interface pages of an application in an appropriate manner.

2. Related Art

Explosive growth in digital processing technology has led to the ubiquitous presence of applications of every kind running on an immense spectrum of devices. Most applications include a graphical user interface through which an operator interacts with the application. For instance, an insurance claim processing application presents user interface screens that guide the operator through the claim submission, validation, and payment/rejection process.

It is the case, however, that not every customer of an application has exactly the same needs. In some instances it would be beneficial to customize the graphical user interface of an application to better suit the needs of a particular customer. Generally speaking, tools exist that assist with the creation of graphical user interfaces (as examples, the Adobe™ Dreamweaver™ web page designer and the Microsoft™ Visual Basic™ programming language). However, existing tools also present a bewildering array of design options that may not always be appropriate for a particular application.

A need exists to solve this problem and others previously experienced with graphical user interface design.

SUMMARY

A page design system addresses the need to constrain modification of pages of a graphical user interface in an appropriate manner. The graphical user interface includes pages and display groups within each page, and the page design system permits each individual page to be modified to suit the needs of a particular customer. So that the pages do not depart from their fundamental purpose to too great of an extent, the page design system guides and constrains the modifications to each page. In particular, the page design system constrains customization of each display group according to established definitions of admissible graphical user interface elements that are appropriate for each page and each display group of elements within the page.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. In the figures, like reference numerals designate corresponding parts throughout the different views.

DETAILED DESCRIPTION OF THE PREFERRED EMBODIMENTS

Figure 1:
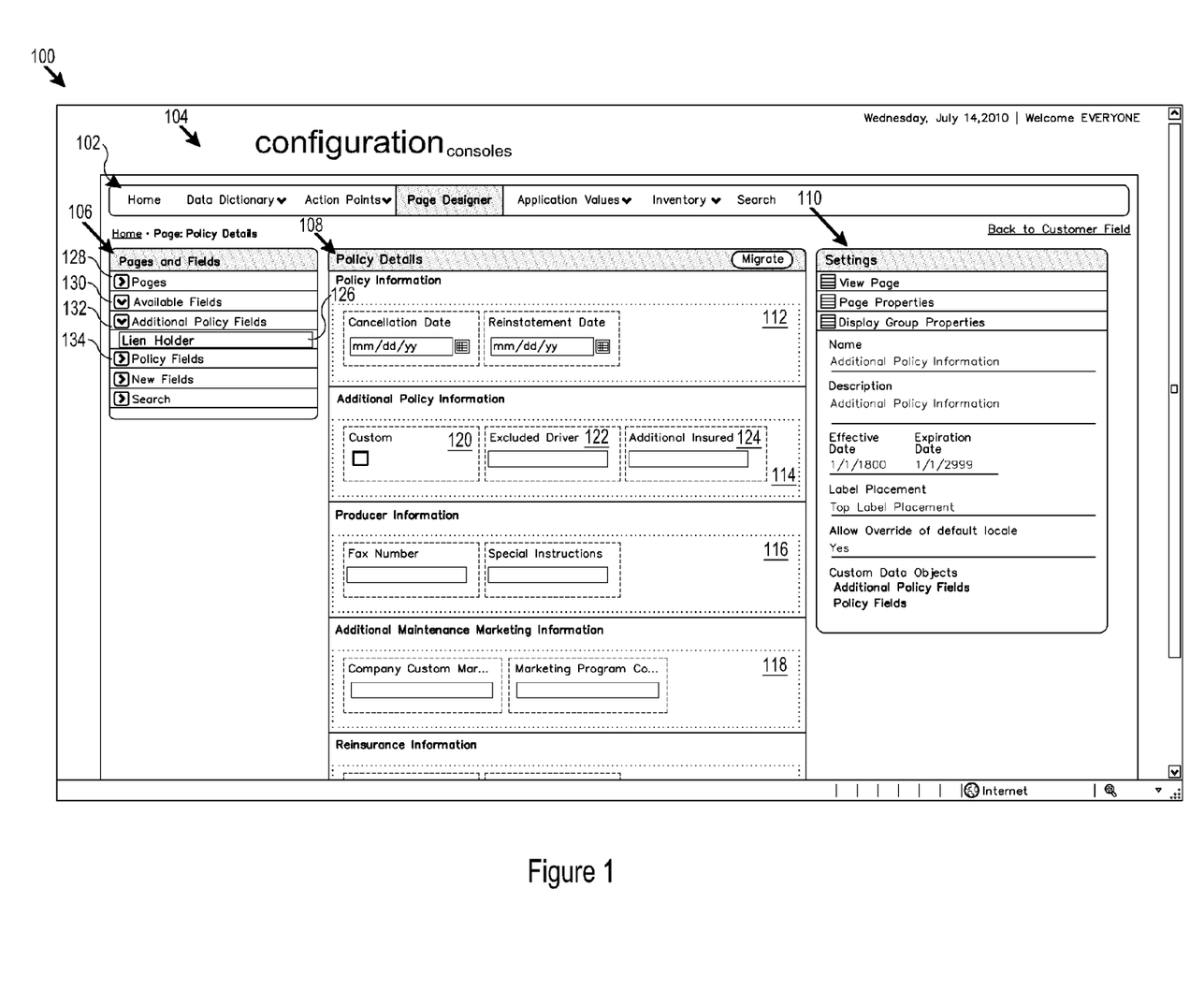
FIG. 1 shows a first example of a user interface for a page designer.
Figure 2:
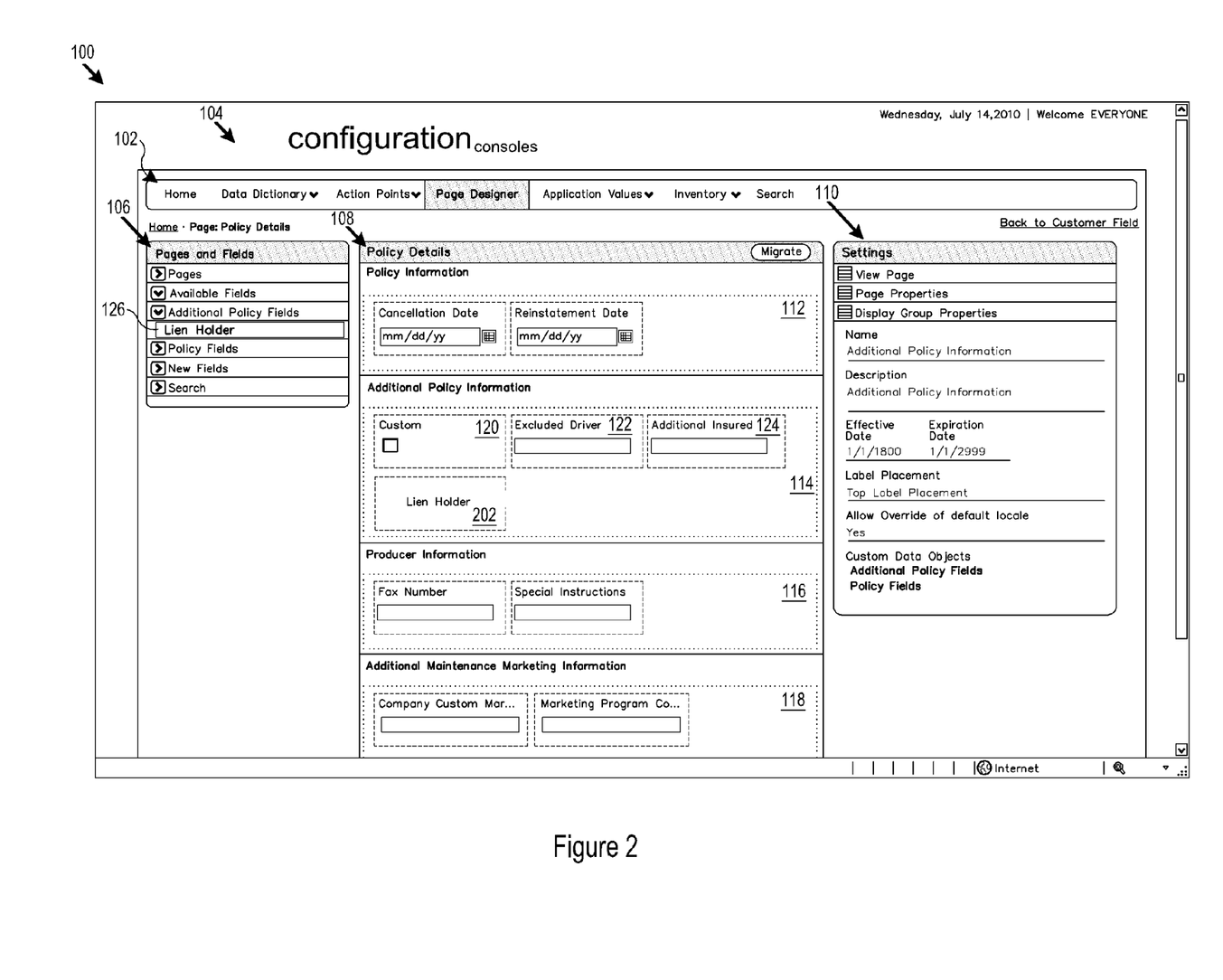
FIG. 2 shows a second example of a user interface for a page designer.
Figure 3:
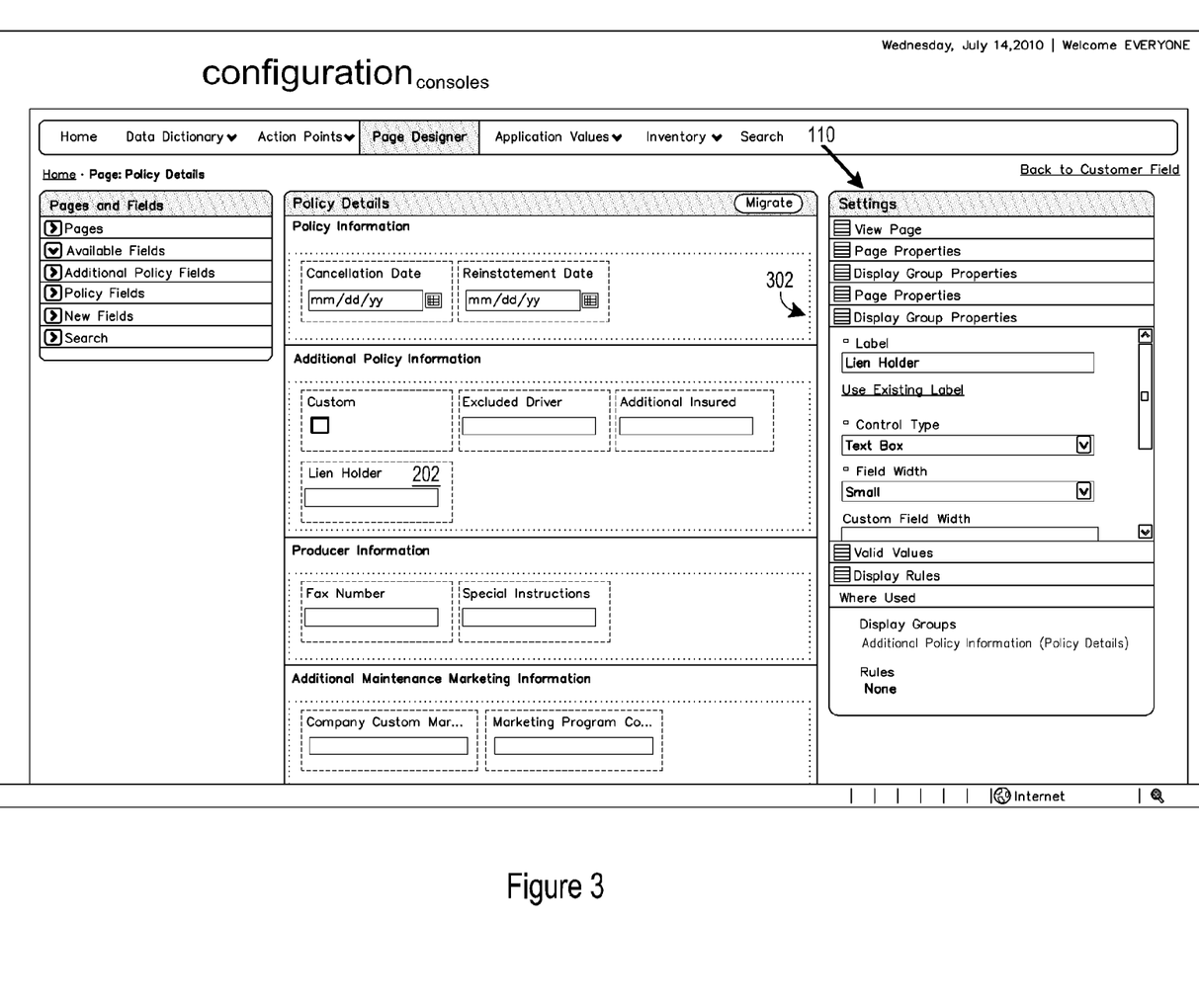
FIG. 3 shows a third example of a user interface for a page designer.

FIG. 1 shows a graphical user interface (GUI) 100 for a configuration console application ("GUI 100"), and in particular for a page designer application within the configuration console. The GUI 100 includes a navigation pane 102 of navigation selections 104 such as "Home", "Data Dictionary", "Action Points", and "Page Designer". Each navigation selection 104 navigates the configuration console application between different specialized applications centrally managed under the configuration console application. The navigation selection "Page Designer" is shown currently selected, and FIGS. 1-3 show GUIs of the page designer application.

The GUI shown in FIG. 1 displays a GUI selection palette 106, a GUI page 108, and a configuration palette 110. The GUI page 108 shows, in the example shown in FIG. 1, a Policy Details GUI page for an insurance application. The page designer application facilitates constrained customization of GUI pages. Although the example of an insurance application is used below, the GUI pages may be tailored to any application.

The Policy Details page includes display groups, four of which are labeled 112, "Policy Information"; 114, "Additional Policy Information"; 116, "Producer Information"; and 118, "Additional Maintenance Marketing Information". A GUI page for an application may include any number of display groups. Any of the display groups may organize specific GUI elements together under the display group. The organization may be visual, for example, in which the organized GUI elements are grouped together for display, such as within a displayed boundary (e.g. a shape such as a rectangle drawn around the elements); logical, for example, in which the organized GUI elements are linked together in a functional way; or implemented in other ways. Thus, the display group represents a section on an application page. Typically, the application groups GUI elements logically into these sections. The GUI elements appear grouped together in display groups within the page designer application. For example, the Additional Policy Information display group 116 visually organizes together the Custom GUI element 120, the Excluded Driver GUI element 122, and the Additional Insured GUI element 124.

The GUI elements may vary widely in form and function. Examples of GUI elements include: text boxes, read-only text fields, display text, number fields, and description text. Additional examples of GUI elements include date fields, checkboxes, combo boxes, multi-select combo boxes, radio buttons and hyperlinks.

As explained in more detail below, the page designer application applies standard data objects and custom data objects to constrain customization of the GUI page 108. A standard data object links to the GUI page 108 and establishes permissible GUI elements with respect to the GUI page 108 as a whole. In other words, the standard data objects define GUI elements that are allowed to appear in any display group present in a particular GUI page. A custom data object links to one or more particular display groups and establishes permissible GUI elements specifically respect to those display groups. In other words, the custom data object defines GUI elements that are allowed to appear in particular display groups. Accordingly, as the designer selects different display groups in the GUI page 108 to customize, the admissible GUI elements for the selected display group change depending on the custom data objects linked to the selected display group. More specifically, the page design logic determines that a particular display group is selected from among multiple display groups, determines the custom data objects linked to the display group, and determines the permissible GUI elements with respect to the selected display group established by the custom data objects linked to the selected display group (in addition to the permissible GUI elements defined by the standard data objects).

As mentioned above, the page designer application displays the GUI page 108, the display groups 112-118 in the GUI page, and the GUI selection palette 106. The page design logic that implements the page designer application analyzes the custom data objects and the standard data objects to determine how to constrain customization of the GUI page 108. In particular, the page design logic populates the GUI selection palette 106 with selections of admissible GUI elements, such as the Lien Holder GUI element selection 126. The admissible GUI elements include the permissible GUI elements established with respect to the GUI page 108 by the standard data objects and the permissible GUI elements with respect to the selected display group established by the custom data objects. The page design logic constrains customization of the selected display group to the admissible GUI elements in the GUI selection palette 106.

Further with regard to the GUI selection palette 106, the Pages selector 128 may be a drop down list of the pages defined in the application. The designer may then select any page desired to configure from the drop down list. The Available Fields selector 130 may present a list of permissible GUI elements (e.g., data fields) defined by the custom and standard data objects for a particular selected page. Custom selectors, such as the Additional Policy Fields selector 132 may display a list of permissible GUI elements for a particular selected display group such as the Additional Policy Information display group 114. The permissible GUI elements displayed in the selector 132 may then change depending on the selected display group and the custom data objects defined for the selected display group (the standard data objects are defined for the selected page as a whole and are therefore consistently display regardless of which display group is selected). The system may, if desired, further constrain configuration by preventing the same permissible GUI element from being added twice to the same page. The Policy Fields selector 134 may display a drop down list of standard data objects for a particular page.

In one implementation, the page design logic organizes the GUI selection palette 106 by custom data objects. For example, the GUI selection palette 106 may include an expandable/collapsible entry for any given custom data object, under which are organized the permissible GUI elements defined by that custom data object. The GUI selection palette 106 may include separate links or other mechanisms to switch display to permissible GUI elements defined by custom data objects or standard data objects.

There may be multiple custom data objects that each establish permissible GUI elements with respect to the selected display group. In such cases, the page design logic may populate the GUI selection palette 106 with the permissible GUI elements from each custom data object. The page design logic accepts from the designer a selection of a specific admissible GUI element from among the admissible GUI elements in the GUI selection palette 106 and permits the designer to add the specific admissible GUI element to the selected display group (e.g., through a drag and drop, double click, or other operation). FIG. 2 shows an example in which the designer has added the permissible Lien Holder GUI element 202 from the GUI selection palette 106 to the Additional Policy Information display group 114.

In some implementations, the page designer application may setup data type definitions that establish allowable data types for the admissible GUI elements. The page design logic may then interact with the designer to customize GUI elements by assigning a designer selected data type definition to the specific admissible GUI element that the designer has added to a display group. Given the selected data type definition, the page design logic may also accept, from the designer, GUI element customization information constrained by the selected data type definition.

To support the customization, the page design logic may establish a correspondence table from data types to available GUI controls. Table 1 shows an example of the correspondence table that the page design logic may implement. In other words, when a designer chooses a particular data type definition for the GUI element to the selected display group, the page design logic may then allow the designer, as a customization, to select between various available controls that the GUI element will implement, as constrained by the correspondence table for the selected data type definition.

TABLE 1

| Data Type | Available GUI controls |
| --- | --- |
| Phone | Text Box, Read-Only Text Field, Display Text |
| Number | Number |
| Text | Description Text, Read-Only Text Field, Text Box, Display Text |
| Date | Date |
| Valid Value List | Checkbox, Combo Box, Multi-Select Combo Box, Radio Button |
| Single Valid Value | Display Text, Read-Only Text Box |
| Boolean | Checkbox, Combo Box, Radio Button |
| Time | Time |
| Currency | Currency |
| Year | Text Box, Read-Only Text Field, Display Text |
| Email | Text Box, Read-Only Text Field, Display Text |
| Web Address | Hyperlink, Text Box, Read-Only Text Field, Display Text |

Alternatively or additionally, the page design logic may establish a correspondence table from available GUI controls to data types. Table 2 shows an example of the correspondence table that the page design logic may implement. In other words, when a designer chooses a particular GUI control for the new GUI element added to the selected display group, the page design logic may then allow the designer, as a customization, to select between various available data types established in the correspondence table for the selected GUI control.

TABLE 2

| GUI control | Available Data Types |
| --- | --- |
| Currency | Currency |
| Checkbox | Boolean, Valid Value List |
| Combo Box | Boolean, Valid Value List |
| Date | Date |

TABLE 2-continued

| GUI control | Available Data Types |
| --- | --- |
| Description Text | Text |
| Display Text | Phone, Text, Single Valid Value, Year, Email, Web Address |
| Hyperlink | Web Address |
| Multi-Select Combo Box | Valid Value List |
| Number | Number |
| Radio Button | Valid Value List, Boolean |
| Read-Only Text Field | Phone, Text, Single Valid Value, Year, Email, Web Address |
| Text Box | Phone, Text, Year, Email, Web Address |
| Time | Time |

FIG. 3 shows an example of the GUI element property customization. In particular, FIG. 3 shows that the page design logic has expanded the configuration palette 110 to include property customization selections 302 for the Lien Holder GUI element 202. In the example shown in FIG. 3, the customization selections 302 include a Field Properties selection, a Field Display Properties selection, a Valid Values selection, and a Display Rules selection. The Field Properties selection may include customization options for viewing and modifying global properties of the field itself rather than display properties of a particular instance of the field on the page (which are shown in the Field Display Properties selection). These global properties are characteristics such as the name of field, business data type (e.g., is it a Text field or Numeric or a set of values to be displayed in a combo box, and so on), Effective and Expiration Dates for the field, and other properties. Characteristics that can be customized once the field has been created and saved, include, as examples, the Description for the field, the Effective and Expiration Dates for the field, Field Length (max length), Default Value, Edit Authorization (i.e., which user types can edit this field), View Authorization (i.e., which user types can see this field), and Help Text for the field. When the field is first created, all the properties in the Field Properties selection may be set as editable/customizable.

The Field Display Properties selection may include customization options for a label for the GUI element 202, the type of GUI element (e.g., a text box), the GUI element width, or other customization options. The Valid Values selection may include customization options for limiting the values that may be entered into the GUI element 202. In particular, the Valid Values selection shows the valid values which are associated to this GUI element (i.e., if the GUI element is a combo box, this shows the values that may appear in the combo box). The user can customize individual valid values through the Valid Values selection (including expiring the ones they no longer want to appear in the combo box) as well as add additional valid values. The user can also relate valid values to other valid values. For example, if there are GUI elements for State and County, the user can relate State valid values to applicable County valid values so that if user selects a State, the GUI element for County will only contain applicable Counties.

The Display Rules selection may include customization options that specify when the GUI element 202 is displayed. In particular, the Display Rules selection allows the user to configure when the selected GUI element is hidden or disabled. The default behavior may be, for example, to always to show and enable (make editable) the GUI element. The Display Rules selection allows the user to always hide or hide based on an expression (e.g., a logical condition that the user specifies) as well as always disable or disable based on expression (e.g., a logical condition that the user specifics).

Additional, fewer, or different property customization options may be present, and they may change depending on the type of GUI element to which they apply. For example, a text box GUI element may have field width or label property customization options, while a combo box GUI element may have property customization options that define the entries in the combo box, how they are formatted and displayed, and other customization options.

Figure 4:
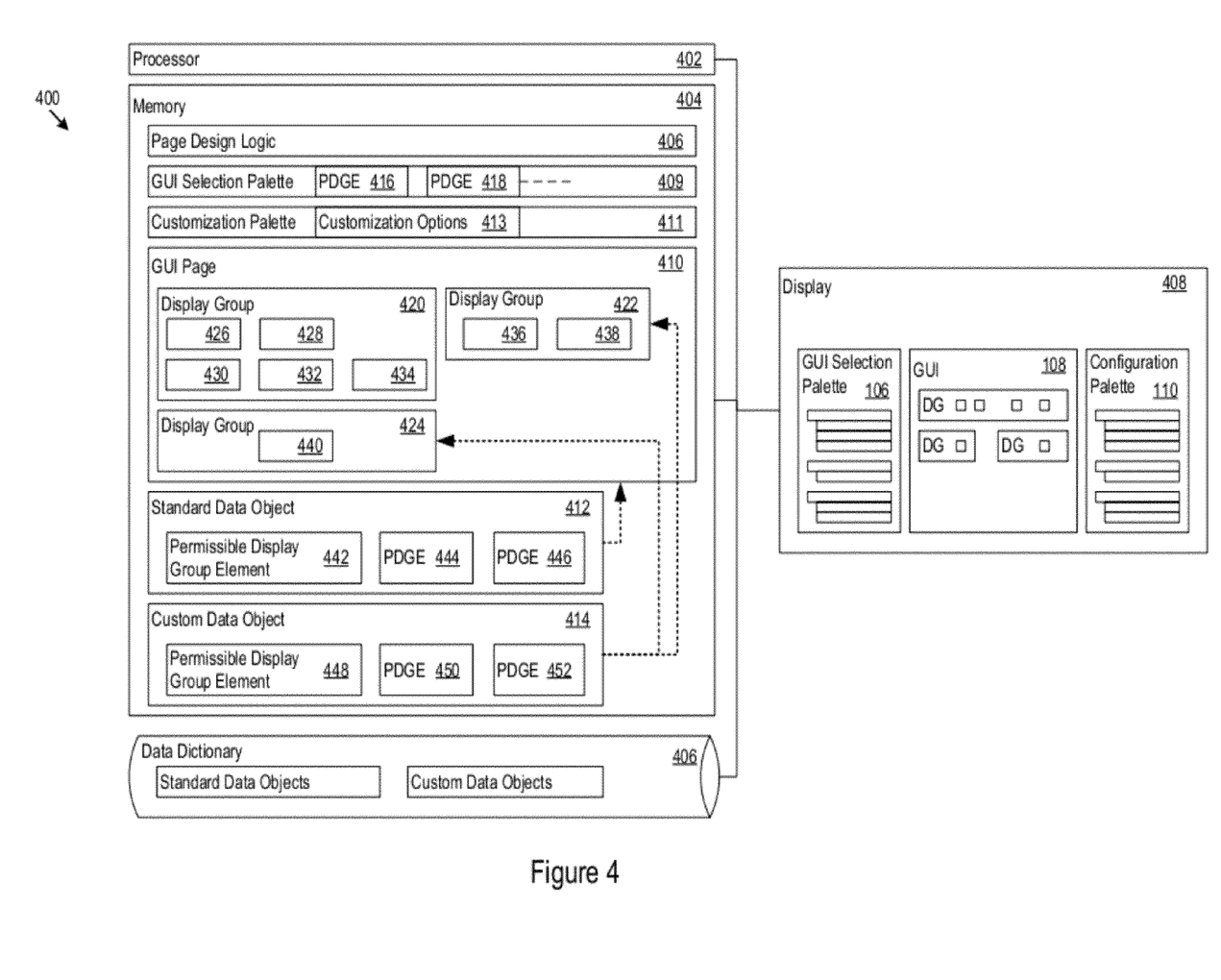
FIG. 4 shows a system implementation of a page designer.

FIG. 4 shows a system implementation 400 of a page designer ("system 400"). The system 400 includes a processor 402, a memory 404, and a data dictionary 406. A local or remote display 408 may display the configuration console application, including the various applications within the console, such as the page designer application. The processor 402 executes the page design logic 406 to interact with a designer to facilitate constrained customization of GUI pages as explained above.

To that end, the memory 404 stores the information on which the page design logic 406 operates. For example, the page design logic 406 may store, define, read or modify, in the memory 404, the GUI selection palette 409, GUI page 410, customization palette 411, standard data objects 412, and custom data objects 414. As shown in FIG. 4, the page design logic 406 populates the GUI selection palette 408 with permissible display group GUI elements ("PDGEs"), two of which are labeled PDGE 416 and PDGE 418. There may be any number, including zero, of such PDGEs for any given display group. The page design logic 406 also populates the customization palette 411 with customization options 413 appropriate for a selected GUI element.

The GUI page 410 includes any number of display groups. Three such display groups are labeled in FIG. 4 as display groups 420, 422, and 424. The display groups organize GUI elements. There may be any number of GUI elements organized under a display group. As examples, display group 420 includes GUI elements 426, 428, 430, 432, and 434; display group 422 includes GUI elements 436 and 438; and display group 424 includes the GUI element 440.

As noted above, the standard data object 412 is linked to the GUI page 410 to define permissible display group GUI elements for the GUI page 410 as a whole. Three PDGEs 442, 444, and 446 from the standard data object 412 are shown in FIG. 4. Any of the PDGEs may be defined in advance. In this way, the designer has some flexibility to change the design of the GUI pages, yet cannot stray too far from the original design of the GUI pages 410. Similarly, the custom data object 414 defines PDGEs 448, 450, and 452 that are available for the display groups to which the custom data object is specifically linked. The system 400 may implement the links as pointers, database fields defined in tables (e.g., as described in more detail below) that represent the standard data objects 412 and custom data objects 414 (e.g, with a database field specifying identifiers of linked GUI pages and display groups), or in other ways.

Figure 5:
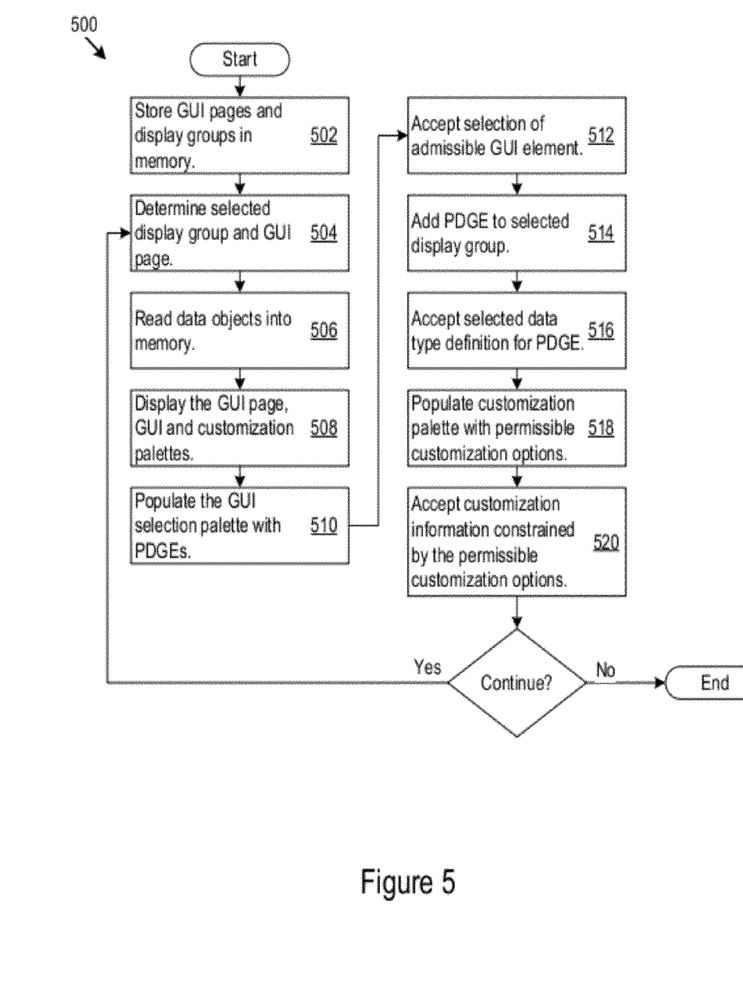
FIG. 5 shows page design logic that may be implemented in a page design system.

FIG. 5 shows page design logic 500 that may be implemented in a page design system (e.g., as a program for the page design logic 406 running in the memory 404 and executed by the processor 402). The page design logic 500 stores, in the memory 404, the GUI pages 410 for the application that will be customized (502). The GUI pages 410 may be expressed in many different manners, such as Hypertext Markup Language (HTML), eXtensible Markup Language (XML), or other manners. The GUI pages 410 include display groups which are also present in the memory 404. The page design logic 500 determines which GUI page and display group that the designer has selected to customize (504). The page design logic 500 further reads the custom data objects 414 and standard data objects 412 for the selected GUI page and the display groups from the data dictionary 406 into the memory 404 (506).

The page design logic 500 displays the GUI page (e.g., on the display 408), including the display groups defined for the GUI page, as well as the GUI selection palette 408 and configuration palette 409 (508). Based on the selected GUI page, display group, and associated custom and standard data objects, the page design logic 500 populates the GUI selection palette 409 with permissible display group elements (510). The page design logic 500 constrains customization of the GUI page to the permissible display group elements. To that end, the page design logic 500 may accept a selection of a specific admissible GUI element from among the admissible GUI elements (512) and add the specific admissible GUI element to the selected display group (514).

In addition, the page design logic 500 may accept a selection of, and assign a specific data type definition to, the selected permissible GUI element (516). The data type definition may contribute to determining the customization options available for the GUI elements. Accordingly, the page design logic 500 populates the customization palette 411 with the permissible customization options 413 (518). The page design logic 500 accepts customization information from the designer constrained by the permissible customization options 413 and sets the GUI element properties accordingly (520).

Figure 6:
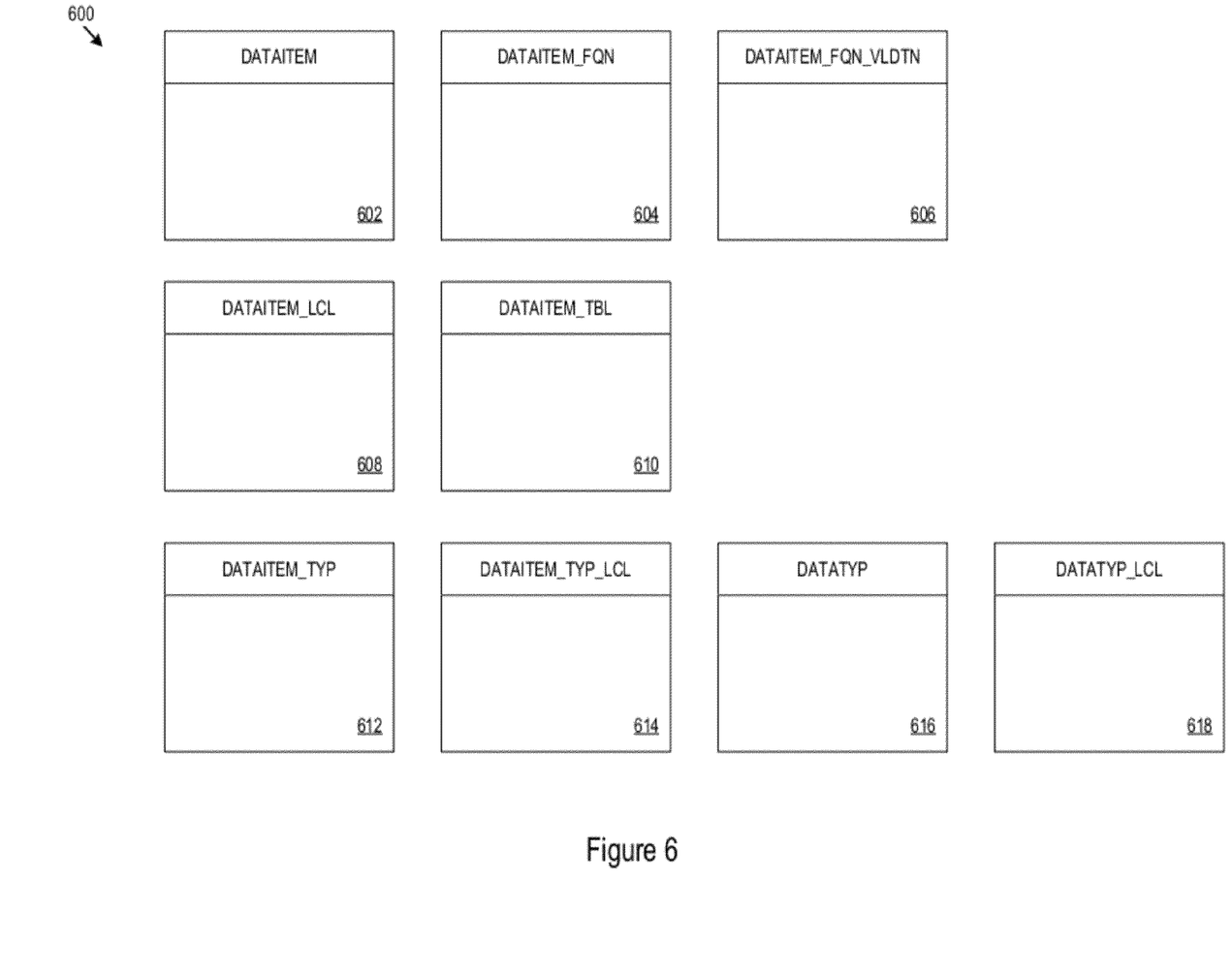
FIG. 6 shows example database tables for implementing a standard data object.

FIG. 6 shows an example database implementation 600 for standard data objects, and also for supporting custom data objects. In particular, the example database implementation 600 includes several database tables that support the creation, modification, and manipulation of standard data objects and customer data objects. As an overview, the database implementation 600 includes a data item table 602 (DATAITEM), data item fully qualified name table 604 (DATAITEM_FQN), a data item fully qualified name validation table 606 (DATAITEM_FQN_VLDTN), a data item localized table 608 (DATAITEM_LCL), and a physical data item table 610 (DATAITEM_TBL). The database implementation 600 further includes a data item type table 612 (DATAITEM_TYP), a data item type localized table 614 (DATAITEM_TYP_LCL), a datatype table 616 (DATATYP), and a datatype localized table 618 (DATATYP_LCL). These tables are summarized in Table: Standard Data Object, below, and described in more detail below.

TABLE STANDARD DATA OBJECT

| Description | Table Name |
| --- | --- |
| Defines data items in the system. A data item may be a data element, extended data element, logical table or column, alias or other data item. | Data Item (602) |
| Defines the fully-qualified name for a data item. For example, if the "State" data element exists in a data item then this table would specify the full "path" (e.g., Contract.Address.State). | Data Item Fully Qualified Name (604) |
| Specifies the validations that should be performed for a specific data item. | Data Item Fully Qualified Name Validation (606) |
| Contains locale-specific information about a data item, to provide language or other localization characteristics of the data item. | Data Item Localized (608) |
| This table lists the physical tables (as defined elsewhere in the data model) that the given data item has the primary keys for. The data item may be defined as a "Data Group" (DATAITEM.C_DATAITEM_TYP = 'DATAGRP') data item. | Data Item Table (610) |
| Defines the various types of data items that are defined in the Data Item table. | Data Item Type (612) |
| Contains locale-specific information about a Data Item Type | Data Item Type Localized (614) |
| Defines the data types that are available and used within the system. This includes, e.g., both core .NET data types and application-specific types. | Datatype (616) |
| Contains locale-specific information about a Data Type. | Datatype Localized (618) |

The data item table 602 stores both standard and custom data objects, and the permissible GUI elements (e.g., the fields) for both standard and custom objects. For example, to define a standard data object (which may be referenced as a "DTO" below), an application designer may insert the standard data objects and their fields into the data item table 602. The system 400 may then query the data item table 602 to determine available standard (and custom) data objects and their fields.

Table DATAITEM table, below, provides an example of how the data item 602 may be implemented.

TABLE DATAITEM

| Description | Column Name |
| --- | --- |
| This column uniquely identifies the data item. If the data item is a standard data object, then this column is the name of the class (without the namespace prefix). If the data item is an Element/property within a standard data object then this is the name of the property as specified in the code. | Data Item Name |
| This is a code used for representing a type of Data Item in the data dictionary. There is a pre-defined and fixed set of Data Item types that the architecture supports. | Data Item Type Code |

TABLE DATAITEM-continued

| Description | Column Name |
|---|---|
| This column contains the code that represents the datatype of the data item. The list of valid datatypes is defined in the Datatype table. | Datatype Code |
| This column will contain the name of a RefData category if the data item corresponds to a key within a RefData category. For example, if the Data Item is "StateCode" then this column might contain the name of a RefData category called "States". This can be used by configuration consoles to aid the user when configuring activities, extension points, etc. | Category Name |
| If the data item is of type "ALIAS", then this column contains the name of the data item that is being aliased. For example, if a standard data object data item has a name "CustomerDTO" it may be necessary to define an alias of that called "Customer". In that case, the "Customer" data item would be defined of type "ALIAS" and this column would contain "CustomerDTO". | Aliased Data Item Name |
| This is a code that indicates the format mask (defined in a FRMT_MSK table) that, by default, should be used when displaying a formatted value for this data item. It is possible for this to be overridden if the data item is added to a Display Group. | Default Format Mask Code |
| This column contains the name of the functional data group that the data item belongs to. This does not necessarily represent a physical group and is different than a "data group" type of data item. This column provides a way of functionally grouping together similar data items to aid in the configuration activities. | Functional Data Group Code |
| This field contains the code that represents the help text to display for field level help associated with this data time. | Help Text Code |
| This optionally contains the name of an anchor (location tag) in the help text that should be navigated to when the help is displayed. This allows a single help entry to contain information for multiple data items and the appropriate help section will be navigated to when displayed. | Help Anchor Name |
| This column serves two purposes. It identifies the last transaction that modified the record. This may tie to the system auditing columns. The other purpose of this column is to be the optimistic lock key. | Last Transaction Id |
| If this column is not null it contains the code for the Business Data Type that was used as the template when creating the Data Item. | Business Data Type Code |

Table DATAITEM_FQN table, below, provides an example of how the data item fully qualified name table 604 may be implemented.

TABLE DATAITEM_FQN

| Description | Column Name |
|---|---|
| This is the fully qualified name for the data item, e.g., the full listing of the DTOs in which the data item is located (e.g., DTO1.DTO2.DATAITEM). | Data Item Fully Qualified Name |
| Primary key that points to the data item itself in the data item table. | Data Item Name |
| Used to set an edit rule that determines, e.g., which users can edit the data item. | Edit Authorization Rule Name |
| Used to set a real-only rule that determines, e.g., which users have read-only access to the data item. | Read Authorization Rule Name |
| This column serves two purposes. It identifies the last transaction that modified the record. This may tie to the system auditing columns. The other purpose of this column is to be the optimistic lock key. | Last Transaction Id |
| This is the name of the model data service that can be used to retrieve the data corresponding to the given data item fully qualified name.. | Model Data Service Name |
| This is the fully qualified name for the data item, e.g., the full listing of the DTOs in which the data item is located (e.g., DTO1.DTO2.DATAITEM). | Data Item Fully Qualified Name |
| This is a primary key that point to the validation itself in the validation table. | Validation Name |

Table DATAITEM_FQN_VLDTN table, below, provides an example of how the data item fully qualified name validation table 606 may be implemented.

TABLE DATAITEM_FQN_VLDTN

| Table Column Name | Description | Column Name |
|---|---|---|
| N_DATAITEM_FQN | This is the fully qualified name for the data item, e.g., the full listing of the DTOs in which the data item is located (e.g., DTO1.DTO2.DATAITEM). | Data Item Fully Qualified Name |
| N_VLDTN | This is a primary key that point to the validation itself in the validation table. | Validation Name |
| V_SRT_ORD | This is the sort order of the validations for the data item fully qualified name (e.g., if the a data item FQN has more than one validation, this determines the order of those validations for that data item FQN). | Sort Order Value |
| B_RQRD_VLDTN_TYP | If this column is true (1) it indicates that the given validation exists to verify the data item contains a value. In other words, the data item is required to have a value and this validation exists to make sure a value exists. | Required Validation Type Flag |
| G_LAST_TXN_ID | This column serves two purposes. It identifies the last transaction that modified the record. This may tie to the system auditing columns. The other purpose of this column is to be the optimistic lock key. | Last Transaction Id |

Table DATAITEM_LCL table, below, provides an example of how the data item localized table 608 may be implemented.

TABLE DATAITEM_LCL

| Description | Column Name |
|---|---|
| Primary key that points to the data item itself in the data item table. | Data Item Name |
| This column contains the identifier of the locale that the record is for. This value and other values used in other tables may be defined in separate table in the system (e.g., a table called LCL). | Locale Id |
| This is the description for the data item as shown on the page designer user interface in the Field Properties panel Description Field. | Data Item Text |
| The G_LAST_TXN_ID column serves two purposes. It identifies the last transaction that modified the record. This may tie to the system auditing columns. The other purpose of this column is to be the optimistic lock key. | Last Transaction Id |
| This is the display name for the data item which may be displayed in the configuration user interface. | Data Item Display Name |

Table DATAITEM_TBL table, below, provides an example of how the physical data item table 610 may be implemented.

TABLE DATAITEM_TBL

| Description | Column Name |
|---|---|
| Primary key that points to the data item itself in the data item table. | Data Item Name |
| This is the name of a physical table (defined in the TBL table) that the given Data Item contains the primary keys for. The Data Item may be specified, e.g., as "DATAGRP". This information may be used when doing configuration. | Table Name |
| This column serves two purposes. It identifies the last transaction that modified the record. This may tie to the system auditing columns. The other purpose of this column is to be the optimistic lock key. | Last Transaction Id |

Table DATAITEM_TYP table, below, provides an example of how the data item type table 612 may be implemented.

TABLE DATAITEM_TYP

| Description | Column Name |
|---|---|
| This is a code used for representing a type of Data Item in the database. There may be a pre-defined and fixed set of Data Item types that the architecture supports. | Data Item Type Code |
| This column contains the date that the record went into effect. It is possible for this date to be in the future. | Begin Date |
| The column contains the date the record will expire. This date may be greater than or equal to the D_BEG column's value. Setting this field equal to the D_BEG value may logically delete the record (e.g., make the record so it was never active). | End Date |
| This column serves two purposes. It identifies the last transaction that modified the record. This may tie to the system auditing columns. The other purpose of this column is to be the optimistic lock key. | Last Transaction Id |

Table DATAITEM_TYP_LCL table, below, provides an example of how the data item type localized table 614 may be implemented.

TABLE DATAITEM_TYP_LCL

| Description | Column Name |
|---|---|
| This is a code used for representing a type of Data Item in the data dictionary. There is a pre-defined and fixed set of Data Item types that the architecture supports. | Data Item Type Code |
| This column contains the identifier of the locale that the record is for. | Locale Id |
|  | Data Item Type Text |
| This column serves two purposes. It identifies the last transaction that modified the record. This may tie to the system auditing columns. The other purpose of this column is to be the optimistic lock key. | Last Transaction Id |

Table DATATYP table, below, provides an example of how the datatype table 616 may be implemented.

TABLE DATATYP

| Description | Column Name |
|---|---|
| This is a code that represents the datatype. Other tables will reference this code. | Datatype Code |

TABLE DATATYP-continued

| Description | Column Name |
| --- | --- |
| This is the fully qualified name for the data type, e.g., the full listing of the DTOs in which the data type is located (such as DTO1.DTO2.DATATYPE). | Datatype Fully Qualified Name |
| This flag is used to indicate whether the datatype can be used when defining a Data Item of type Extended Data (i.e., DATAITEM.C_DATAITEM_TYP = 'EXTDATA'). | Allow Extended Data Flag |
| This column serves two purposes. It identifies the last transaction that modified the record. This may tie to the system auditing columns. The other purpose of this column is to be the optimistic lock key. | Last Transaction Id |
| This flag is used to indicate whether the datatype can be used when defining a Data Item of type Element (i.e., DATAITEM.C_DATAITEM_TYP = 'ELEMENT'). | Allow Element Flag |
| This flag is used to indicate whether the datatype can be used when defining a Data Item of type Data Group (i.e., DATAITEM.C_DATAITEM_TYP = 'DATAGRP'). | Allow Data Group Flag |

Table DATATYP_LCC table, below, provides an example of how the datatype localized table 618 may be implemented.

TABLE DATAITEM_TYP_LCL

| Description | Column Name |
| --- | --- |
| This is a code that represents the datatype and is defined in the Datatype table. | Datatype Code |
| This column contains the identifier of the locale that the record is for. | Locale Id |
| This is the description of the data item type, which may not be exposed in the page designer user interface or other interfaces. | Datatype Text |
| This column serves two purposes. It identifies the last transaction that modified the record. This may tie to the system auditing columns. The other purpose of this column is to be the optimistic lock key. | Last Transaction Id |

Figure 7:
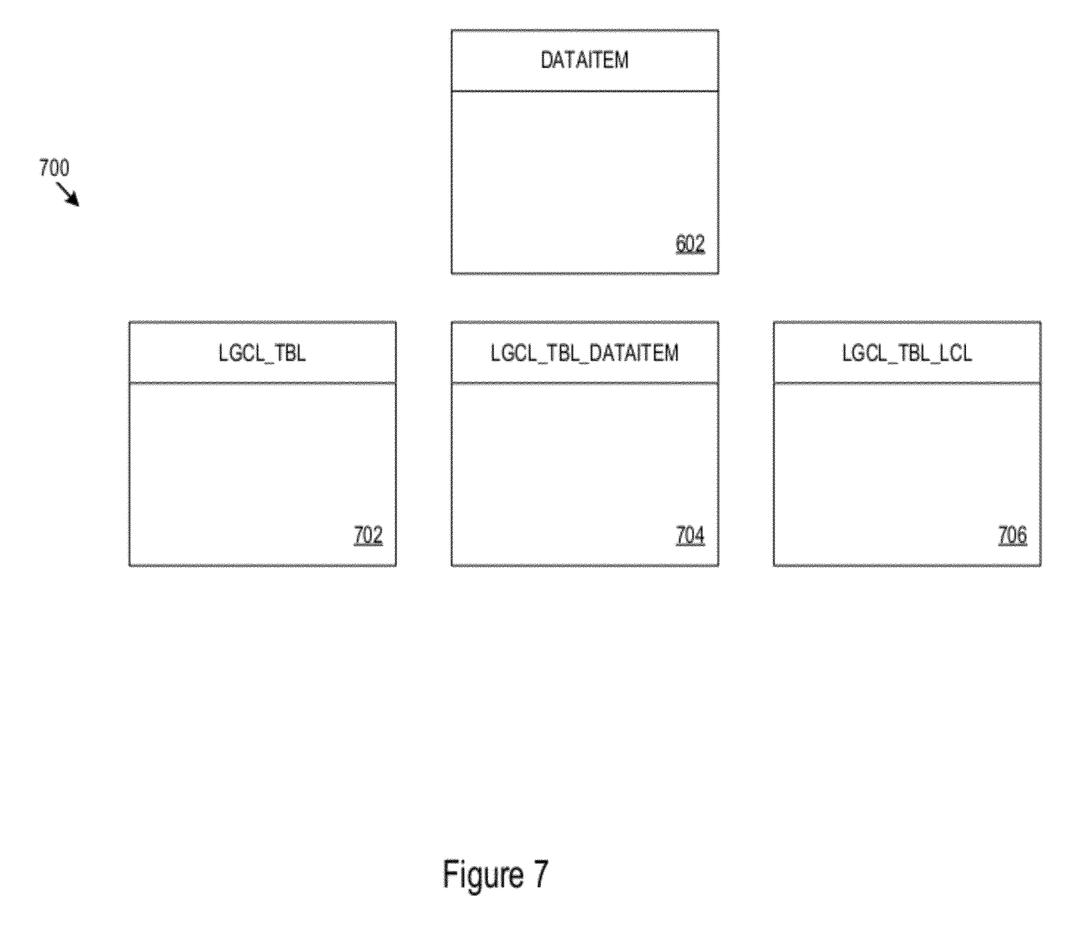
FIG. 7 shows example database tables for implementing a standard data object.

FIG. 7 shows an example database implementation 700 for custom data objects. In particular, the example database implementation 700 includes several database tables that support the creation, modification, and manipulation of custom data objects. As an overview, the database implementation includes a logical table 702 (LGCL_TBL), a logical table data item table 704 (LGCL_TBL_DATAITEM), and a logical table localized table 706 (LGCL_TBL_LCL). These tables are described in more detail below.

Regarding the terminology used below, a logical table is an analog for a custom data object, and a logical column is an analog for a custom field that is included in the custom data object. In one implementation, applications define physical tables that may be extended with logical tables which define custom data objects. For example, if an application includes a physical table storing claim numbers, then a logical table may be defined and linked to the claim number table to define custom fields related to the claim number table.

A display group may correspond to one or more logical tables linked to a physical table. The custom fields that a designer may then add to the display group are available based on logical tables associated together into the display group. For example, a separate association table may associate one or more logical tables to a display group so that the display group includes one or more sets of custom fields defined by one or more logical tables.

As mentioned above, a logical column may define a custom field. Thus, each time that a custom field is desired to be added, a logical column defining that custom field is added to the logical table. Furthermore, the data item table 602 may store field property data as noted above. More specifically, logical columns are defined in the data item table 602. When the column is defined it is given a name, description, and data type. A given logical column may be used in multiple logical tables. When a logical column is added to a logical table, that association is stored in the LGCL_TBL_DATAITEM table 604 and a new fully qualified name is created in the form<logical table>.<logical column> and is associated with the logical column's data item. In addition, the system generates a Logical Column Id, which may be an integer that uniquely identifies the logical column on the logical table. The system may expose public Application Programming Interfaces (APIs) that accept physical table names, logical table names, and logical column names to manipulate logical tables and logical columns. Internally the APIs may translate a logical table and logical column into the appropriate logical column ID.

As stated above, a logical column can be added to multiple logical tables. In one implementation, when a logical column is added to multiple different logical tables then each "instance" of that logical column will contain different data. There need not be sharing of data across logical tables.

The system 400 allows logical extension of the data model by defining new logical tables that contain one or more logical columns. Data extensibility provides the ability to logically add new fields to an existing physical table in an application database without modifying the physical structure of the table. The physical table is logically extended to support capturing additional related data. A physical table can be extended by more than one logical table.

Applications that use data extensibility allow their customers to define new fields without code changes. In one implementation, there are three different tables involved: physical, extension, and logical. The application developer decides which physical tables in the data model can be extended. Extending a physical table may be accomplished by creating an additional database table, the extension table that stores the value for any extended data for the physical table. For example, if the application has a physical table called Customer that stores basic customer information and the application needs to allow clients to define custom data elements related to a customer, the application developer may create an extension table called, e.g., Customer_Extn. The extension table stores the values of all logical columns that a client defines for a customer. The definitions of logical columns are grouped together into logical tables. This allows the client to define many different logical tables that map to the extension table associated with a physical table. For example, the client could define logical tables such as Bank Customer, Person Customer, Airline Customer, and so on, where each logical table has different logical columns, some of which may be in common.

An application team may decide what physical tables can be extended and create the corresponding extension table. Consumers of the application may then define the logical tables and fields that belong to each logical table they define. For example, assume that the application is flexible and reusable software for a bank with core functionality that could apply to numerous banks with slightly different business models and terminology. Any bank system has a core Customer table and a set of fields that would most likely apply to all banks (e.g., CustomerId, CustomerType, DateEnrolled, and Address), but frequently, the customer types among the individual banks vary with different processing and terminology. For example, some banks might have only corporate customers while another bank might have individuals, companies, and government as customer types.

In this scenario, the developer might want to have a single physical table called Customer with the fixed fields CustomerId, CustomerType, DateEnrolled, and Address. The developer also permits extension of the information collected for each customer type to meet their business needs and terminology. With several customer types, a developer may not want to create new tables for each of these types as they could contain duplicate information. Creating normalized tables that join to a common Customertable may also not be an option as the application may need the capability to add and remove fields in the metadata at design-time so the customer site can customize the application. The runtime can then automatically retrieve and display data without requiring modification to the data access service, business service, or web page.

Table Custom Data Object provides an example of the tables that may be used to implement custom data objects.

TABLE CUSTOM DATA OBJECT

| Description | Table Name |
|---|---|
| Contains the definition of a Logical Table. A physical table that has been enabled for extensibility will have a corresponding "extension table" (which is also a physical table). The application and clients can define one or more "Logical Tables" that will use the physical extension table for storing data. | Logical Table (702) |

Table LGCL_TBL, below, provides an example of how the logical table 702 may be implemented.

TABLE LGCL_TBL

| Description | Column Name |
|---|---|
| This column contains the name of the logical table. A physical table can have multiple logical tables defined to extend it. | Logical Table Name |
| This is the name of the physical table (defined elsewhere in the system) that the logical table extends. | Table Name |
| This column contains the date that the record went into effect. It is possible for this date to be in the future. | Begin Date |
| The column contains the date the record will expire. This date may be controlled to be greater than or equal to the Begin Date column's value. Setting this field equal to the Begin Date value may cause logical deletion of the record (e.g., make the record so it was never active). | End Date |
| This column serves two purposes. It identifies the last transaction that modified the record. This may tie to the system auditing columns. The other purpose of this column is to be the optimistic lock key. | Last Transaction Id |

Table LGCL_TBL_DATAITEM, below, provides an example of how the logical table data item 704 may be implemented.

TABLE LGCL_TBL_DATAITEM

| Description | Column Name |
|---|---|
| This is the name of the logical table (as defined in the LGCL_TBL table) that the data item (i.e., logical column) is to be associated with. | Logical Table Name |
| Primary key that points to the data item itself in the data item table. | Data Item Name |
| This is the fully qualified name of the data item. | Data Item Fully Qualified Name |
| This is the name of the physical table (defined elsewhere in the system) that the logical table extends. This column exists on this table so that a unique constraint may be enforced that prevents the same data item to be part of two different Logical Tables that extend the same physical table. | Table Name |
| The column contains the date the record will expire. This date may be controlled to be greater than or equal to the Begin Date column's value. Setting this field equal to the D Begin Date value will logically delete the record (e.g., make the record so it was never active). | End Date |
| This column contains the date that the record went into effect. It is possible for this date to be in the future. | Begin Date |
| | Default Value Text |
| This is one of four "default value" columns on the table. This allows a new logical column to be added to an existing logical table along with a default value. This is similar to adding a new column to a physical table (that already contains data) and specifying a default value for it. This column is used for storing the default of a logical column that is a decimal datatype. If the logical column's datatype is not decimal or no default is needed then this column must be null. | Default Decimal Value |
| | Default Value Timestamp |
| | Default Value Number |
| This column serves two purposes. It identifies the last transaction that modified the record. This may tie to the system auditing columns. The other purpose of this column is to be the optimistic lock key. | Last Transaction Id |

TABLE CUSTOM DATA OBJECT-continued

| Description | Table Name |
|---|---|
| This contains the list of fields that are part of a given logical table. In other words, this table lists the "columns" of each logical table. | Logical Table Data Item (704) |
| Contains locale-specific information about a Logical Table, to provide language or other localization characteristics of the table. | Logical Table Localized (706) |

Table LGCL_TBL_LCL, below, provides an example of how the logical table localized 706 may be implemented.

TABLE LGCL_TBL_LCL

| Description | Column Name |
|---|---|
| This is the name of the logical table. | Logical Table Name |
| This column contains the identifier of the locale that the record is for, which may be defined in another system table. | Locale Id |

TABLE LGCL_TBL_LCL-continued

| Description | Column Name |
| --- | --- |
| This is the description of the Logical Table. As shown in the Configuration Console, this is the description field for the Custom Data Object. | Logical Table Text |
| This column serves two purposes. It identifies the last transaction that modified the record. This may tie to the system auditing columns. The other purpose of this column is to be the optimistic lock key. | Last Transaction Id |
| This is a localized version of the name of the logical table that can be displayed to users. | Logical Table Display Name |

Below is example pseudo code for inserting a new logical column to define a custom field for Eye Color:

```
LogicalColumnDTOeyeColor = new LogicalColumnDTO( )
{
    Set name for new logical column to EyeColor;
    Set BeginDate to the earliest date allowed;
    Set EndDate to the highest date allowed;
    Set Data Type for new logical column to String;
    Assign eye color logical column to desired logical table (e.g., the
Resident table);
    Assign eye color logical column to desired functional data group
(e.g., the Customer Data functional data group);
    Assign locale specific information for the eye color logical
column by:
        Set a locale ID (e.g., to 1033 for English - US);
        Set a description for the eye color logical column which
will be shown in the page designer field properties panel in the description
field (e.g., "The color of the person's eyes");
        Assign a display name for the new eye color logical column
which will be shown in the page designer field properties panel in the field
name field (e.g., "Eye Color");
}
```

Insert new logical column into the tables noted above (e.g., by calling an application programming interface function that inserts the column).

In the description above, one aspect of the page design innovation related to a method for guided design of pages for a graphical user interface (GUI) to an application. The method included defining, in a memory, page design logic, a GUI page, and a display group within the GUI page. The display group organizes specific GUI elements together under the display group. Also defined in the memory is a standard data object linked to the GUI page. The standard data object establishes permissible GUI elements with respect to the GUI page as a whole. Furthermore, a custom data object is defined in memory and is linked to the display group. The custom data object establishes permissible GUI elements with respect to the display group specifically.

The method further includes displaying the GUI page, the display group in the GUI page, and a GUI selection palette. The page design logic is executed with a processor in communication with the memory to populate the GUI selection palette with admissible GUI elements and constrain customization of the display group to the admissible GUI elements in the GUI selection palette. The admissible GUI elements populated into the GUI selection palette include the permissible GUI elements with respect to the GUI page, and the permissible GUI elements with respect to the display group.

The custom data object may be one of multiple custom data objects that each establishes permissible GUI elements with respect to the display group. The page design logic may then populate the GUI selection palette with the permissible GUI elements from each custom data object. To facilitate constrained customization, the page design logic may accept a selection of a specific admissible GUI element from among the admissible GUI elements and add the specific admissible GUI element to the display group.

The admissible GUI elements of the custom data object may vary widely. The memory may also store data type definitions that establish the data types for the admissible GUI elements. The method may also assign a selected one of the data type definitions to the specific admissible GUI element and accept GUI element customization information constrained by the selected one of the data type definitions.

The display group may be one of multiple display groups within the GUI page. Each display group may organize specific GUI elements together under that display group. The method may then execute the page design logic to determine that the display group is selected from among the multiple display groups, determine that the custom data object is linked to the particular selected display group, and determine the permissible GUI elements with respect to the display group established by the custom data object.

In another aspect, a page design system includes a processor and a memory in communication with the processor. The memory stores the GUI page, the display group, the standard and custom data objects, and the page design logic. The system executes the page design logic to perform the processing noted above with respect to constrained customization of the display group. In yet another aspect, a product comprises a machine readable medium and logic stored on the medium, that, when executed by a processor, is operable to cause a page design system to perform the processing noted above with respect to constrained customization of the display group.

The logic and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device or tangible component that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions, or in software in an application programming interface (API) or in a Dynamic Link Library (DLL), functions available in a shared memory or defined as local or remote procedure calls, or as a combination of hardware and software.

The logic and processing described above may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, implemented in libraries such as Dynamic Link Libraries (DLLs), or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for guided design of pages for a graphical user interface (GUI) to an application, the method comprising:
storing, in a memory:
a GUI page;
a display group within the GUI page, the display group operable to organize specific GUI elements together under the display group;
a standard data object linked to the GUI page that establishes permissible GUI elements with respect to the GUI page as a whole;
a custom data object linked to the display group that establishes permissible GUI elements with respect to the display group specifically; and
page design logic;
displaying the GUI page, the display group in the GUI page, and a GUI selection palette; and
executing the page design logic with a processor in communication with the memory to:
link a logical table that defines the custom data object to a physical table that defines the display group by updating an association table with a record associating the custom data object and permissible GUI elements with respect to the display group;
identify admissible GUI elements for the custom data object for the display group by querying the association table for the permissible GUI elements;
populate the GUI selection palette with the admissible GUI elements, the admissible GUI elements comprising:
the permissible GUI elements with respect to the GUI page; and
the permissible GUI elements with respect to the display group; and
constrain customization of the display group to the admissible GUI elements in the GUI selection palette,
wherein the standard data object is defined using one or more physical tables,
wherein the custom data object is defined using a logical table;
wherein the one or more physical tables are extended by one or more extension tables storing values for any extended data for the physical table; and
wherein the logical table is implemented as a group of logical columns stored in the one or more extension tables.

2. The method of claim 1, where the custom data object is one of multiple custom data objects that each establishes permissible GUI elements with respect to the display group, and where executing the page design logic populates the GUI selection palette with the permissible GUI elements from each custom data object.

3. The method of claim 1, further comprising:
executing the page design logic with the processor to:
accept a selection of a specific admissible GUI element from among the admissible GUI elements; and add the specific admissible GUI element to the display group.

4. The method of claim 3, further comprising: defining, in the memory, data type definitions that establish data types for the admissible GUI elements of the custom data object.

5. The method of claim 4, further comprising:
assigning a selected one of the data type definitions to the specific admissible GUI element; and
accepting GUI element customization information constrained by the selected one of the data type definitions.

6. The method of claim 1, where the display group is one of multiple display groups within the GUI page, each display group operable to organize specific GUI elements together under that display group, and further comprising:
executing the page design logic to:
determine that the display group is selected from among the multiple display groups;
determine that the custom data object or each one of the multiple custom data objects is linked to the display group; and
determine the permissible GUI elements with respect to the display group established by the custom data object.

7. A page design system comprising:
a processor; and
a memory in communication with the processor, the memory comprising:
a GUI page;
a display group within the GUI page, the display group operable to organize specific GUI elements together under the display group;
a standard data object linked to the GUI page that establishes permissible GUI elements with respect to the GUI page as a whole;
a custom data object linked to the display group that establishes permissible GUI elements with respect to the display group specifically;
a logical table that defines the custom data object and a physical table that defines the display group, and an association table; and
page design logic, that, when executed by the processor, is operable to:
update the association table with a record associating the custom data object and permissible GUI elements with respect to the display group;
identify admissible GUI elements for the custom data object for the display group by querying the association table for the permissible GUI elements;
populate a GUI selection palette with the admissible GUI elements, the admissible GUI elements comprising:
the permissible GUI elements with respect to the GUI page; and
the permissible GUI elements with respect to the display group; and
constrain customization of the display group to the admissible GUI elements in the GUI selection palette;
wherein the standard data object is defined using one or more physical tables,
wherein the custom data object is defined using a logical table;
wherein the one or more physical tables are extended by one or more extension tables storing values for any extended data for the physical table; and
wherein the logical table is implemented as a group of logical columns stored in the one or more extension tables.

8. The system of claim 7, where the custom data object is one of multiple custom data objects that each establishes permissible GUI elements with respect to the display group, and where the page design logic, when executed, populates the GUI selection palette with the permissible GUI elements from each custom data object.

9. The system of claim 7, where the page design logic, when executed, is further operable to:
   accept a selection of a specific admissible GUI element from among the admissible GUI elements; and
   add the specific admissible GUI element to the display group.

10. The system of claim 9, where the memory further comprises data type definitions that establish data types for the admissible GUI elements of the custom data object.

11. The system of claim 10, where the page design logic, when executed, is further operable to:
    assign a selected one of the data type definitions to the specific admissible GUI element; and
    accept GUI element customization information constrained by the selected one of the data type definitions.

12. The system of claim 7, where the display group is one of multiple display groups within the GUI page, each display group operable to organize specific GUI elements together under that display group, and where the page design logic, when executed, is further operable to:
    determine that the display group is selected from among the multiple display groups;
    determine that the custom data object is linked to the display group; and
    determine the permissible GUI elements with respect to the display group established by the custom data object.

13. A product comprising:
    a non-transitory machine readable medium; and
    logic stored on the medium that when executed by a processor, is operable to cause a page design system to:
       store, in a memory in communication with the processor:
          a GUI page;
          a display group within the GUI page, the display group operable to organize specific GUI elements together under the display group;
          a standard data object linked to the GUI page that establishes permissible GUI elements with respect to the GUI page as a whole; and
          a custom data object linked to the display group that establishes permissible GUI elements with respect to the display group specifically;
          a logical table that defines the custom data object and a physical table that defines the display group, and an association table;
       update the association table with a record associating the custom data object and permissible GUI elements with respect to the display group;
       identify admissible GUI elements for the custom data object for the display group by querying the association table for the permissible GUI elements; and
       populate the GUI selection palette with admissible GUI elements, the admissible GUI elements comprising:
          the permissible GUI elements with respect to the GUI page; and
          the permissible GUI elements with respect to the display group; and
       constrain customization of the display group to the admissible GUI elements in the GUI selection palette.

14. The product of claim 13, where the custom data object is one of multiple custom data objects that each establishes permissible GUI elements with respect to the display group, and where the logic, when executed, populates the GUI selection palette with the permissible GUI elements from each custom data object.

15. The product of claim 13, where the logic, when executed, is further operable to:
    accept a selection of a specific admissible GUI element from among the admissible GUI elements; and
    add the specific admissible GUI element to the display group.

16. The product of claim 15, where the logic further stores in memory data type definitions that establish data types for the admissible GUI elements of the custom data object.

17. The product of claim 16, where the logic, when executed, is further operable to:
    assign a selected one of the data type definitions to the specific admissible GUI element; and
    accept GUI element customization information constrained by the selected one of the data type definitions.

18. The product of claim 13, where the display group is one of multiple display groups within the GUI page, each display group operable to organize specific GUI elements together under that display group, and where the logic, when executed, is further operable to:
    determine that the display group is selected from among the multiple display groups;
    determine that the custom data object is linked to the display group;
    determine the permissible GUI elements with respect to the display group established by the custom data object; and
    populate the GUI selection palette with:
       the permissible GUI elements with respect to the GUI page; and
       the permissible GUI elements with respect to the display group.

* * * * *